(12) United States Patent
Cloux

(10) Patent No.: US 10,235,815 B2
(45) Date of Patent: *Mar. 19, 2019

(54) 3D OBJECT LOCALIZATION WITH QUANTIZATION

(71) Applicant: DASSAULT SYSTEMES, Velizy Villacoublay (FR)

(72) Inventor: Jonathan Cloux, Aix-en-Provence (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 61 days.

This patent is subject to a terminal disclaimer.

(21) Appl. No.: 15/388,830

(22) Filed: Dec. 22, 2016

(65) Prior Publication Data
US 2017/0186244 A1    Jun. 29, 2017

(30) Foreign Application Priority Data

Dec. 24, 2015   (EP) .................................... 15307146

(51) Int. Cl.
*G06K 9/00* (2006.01)
*G06K 9/46* (2006.01)
*G06T 19/20* (2011.01)

(52) U.S. Cl.
CPC .......... *G06T 19/20* (2013.01); *G06K 9/00214* (2013.01); *G06K 9/46* (2013.01); *G06T 2210/56* (2013.01); *G06T 2219/2004* (2013.01)

(58) Field of Classification Search
None
See application file for complete search history.

(56) References Cited

U.S. PATENT DOCUMENTS

2014/0105506 A1* 4/2014 Drost ................. G06K 9/00201
382/199

FOREIGN PATENT DOCUMENTS

EP       2 385 483 A1    11/2011
EP       2 385 483 B1    11/2012

OTHER PUBLICATIONS

McKenzie, Bruce J., Rodney Harries, and Timothy Bell. "Selecting a hashing algorithm." Software: Practice and Experience 20.2 (1990): 209-224.*

(Continued)

*Primary Examiner* — Daniel F Hajnik
(74) *Attorney, Agent, or Firm* — Oblon, McClelland, Maier & Neustadt, L.L.P.

(57) ABSTRACT

The invention notably relates to a computer-implemented method for localizing a 3D modeled object in a 3D scene, the method comprising a positioning of the 3D modeled object in the 3D scene, the positioning being performed following an algorithm that rewards, for each of first couples made of two 3D points of the 3D modeled object and their respective associated normal vectors, a match with a respective second couple made of two 3D point of the 3D scene and its respective associated normal vectors, the first couple being positioned substantially on the second couple, the match between the first couple and the second couple amounting to a substantial integer equality between the value of a quantized descriptor for the first couple and the value of the quantized descriptor for the second couple. This improves the localizing a 3D modeled object in a 3D scene.

20 Claims, 10 Drawing Sheets

(56) References Cited

OTHER PUBLICATIONS

Akizuki, Shuichi, and Manabu Hashimoto. "High-speed and reliable object recognition using distinctive 3-D vector-pairs in a range image." Optomechatronic Technologies (ISOT), 2012 International Symposium on. IEEE, 2012.*
Restrepo, Maria I., et al. "Characterization of 3-d volumetric probabilistic scenes for object recognition." IEEE Journal of Selected Topics in Signal Processing 6.5 (2012): 522-537.*
Extended European Search Report dated Jun. 29, 2016 in Patent Application No. 15307145.1.
Extended European Search Report dated Jun. 29, 2016 in Patent Application No. 15307146.9.
Bertram Drost, et al., "Model Globally, Match Locally: Efficient and Robust 3D Object Recognition", 2010 IEEE Conference on Computer Vision and Pattern Recognition (CVPR), XP031725933, 2010, pp. 998-1005.
Simon Winkelbach, et al., "Low-Cost Laser Range Scanner and Fast Surface Registration Approach", Pattern Recognition, 28th DAGM Symposium, vol. 4174, XP019043113, 2006, pp. 718-728.
Bertram Drost, et al., "3D Object Detection and Localization using Multimodal Point Pair Features", 2012 Second Joint 3DIM/3DPVT Conference: 3D Imaging, Modeling, Processing, Visualization & Transmission, XP032277251, 2012, pp. 9-16.
Michael Calonder, et al., "BRIEF: Binary Robust Independent Elementary Features", Computer Vision—ECCV 2010, vol. 6314, XP01915781, 2010, pp. 778-792.
James Dougherty, et al., "Supervised and Unsupervised Discretization of Continuous Features", Machine Learning, Proceedings of the International Conference, XP002204467, 1995, 9 Pages.

* cited by examiner

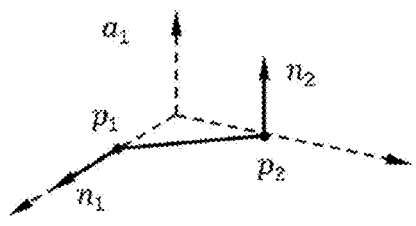
FIG. 14
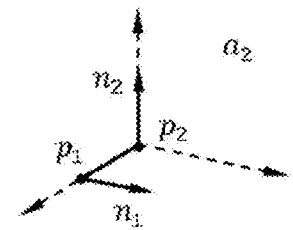
FIG. 15
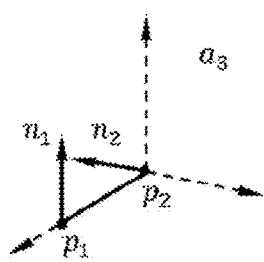
FIG. 16
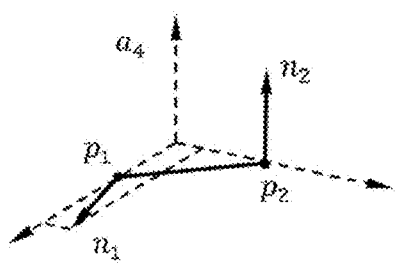
FIG. 17
FIG. 18

3D OBJECT LOCALIZATION WITH QUANTIZATION

CROSS-REFERENCE TO RELATED APPLICATIONS

This application claims priority under 35 U.S.C. § 119 or 365 to European Application No. 15307146.9, filed Dec. 24, 2015. The entire contents of the above application(s) are incorporated herein by reference.

FIELD OF THE INVENTION

The invention relates to the field of computer programs and systems, and more specifically to a method, system and program for localizing a 3D modeled object in a 3D scene.

BACKGROUND

A number of systems and programs are offered on the market for the design, the engineering and the manufacturing of objects. CAD is an acronym for Computer-Aided Design, e.g. it relates to software solutions for designing an object.

CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

These systems may fall within or overlap the fields of computer vision and/or virtual reality. In these fields, different solutions exist that provide localizing a 3D modeled object in a 3D scene, the 3D modeled object and the 3D scene each including respective 3D points, each 3D point being associated to a respective normal vector. Localizing such a 3D modeled object in such a 3D scene may indeed prove useful for many applications, such as 3D reconstruction (e.g. structure-from-motion analysis or multi-view reconstruction) and virtual reality (e.g. markerless augmented reality). In these applications, localizing a specific 3D modeled object in a 3D scene may improve the experience in several known ways.

In this context, some solutions disclose a method comprising a positioning of the 3D modeled object in the 3D scene, the positioning being performed following an algorithm that rewards, for each of first couples made of two 3D points of the 3D modeled object and their respective associated normal vectors, a match with a respective second couple made of two 3D point of the 3D scene and its respective associated normal vectors, the first couple being positioned substantially on the second couple, the match between the first couple and the second couple amounting to a substantial equality between the value of a descriptor for the first couple and the value of the descriptor for the second couple. Distinct examples of such a type of solution include paper "Bertram Drost, Slobodan Inc, *3D Object Detection and Localization using Multimodal Point Pair Features*, Conference on 3D Imaging, Modeling, Processing, Visualization and Transmission (3DIMPVT), 2012", paper "Bertram Drost, Markus Ulrich, Nassir Navab, Slobodan Inc, *Model Globally, Match Locally: Efficient and Robust 3D Object Recognition*, Conference on Computer vision and pattern recognition (CVPR), 2010" and European patent EP2385483.

However, there is still a need to improve on the accuracy or relevance of the result and/or on computation time, when localizing a 3D modeled object in a 3D scene.

SUMMARY OF THE INVENTION

It is therefore provided a computer-implemented method for localizing a 3D modeled object in a 3D scene. The 3D modeled object and the 3D scene each include respective 3D points. Each 3D point is associated to a respective normal vector. The method comprises a positioning of the 3D modeled object in the 3D scene. The positioning is performed following an algorithm. The algorithm rewards, for each of first couples, a match with a respective second couple. The first couples are made of two 3D points of the 3D modeled object and their respective associated normal vectors. The second couples are made of two 3D point of the 3D scene and its respective associated normal vectors. The first couple is positioned substantially on the second couple. The match between the first couple and the second couple amounts to a substantial equality between the value of a descriptor for the first couple and the value of the descriptor for the second couple.

At least a part of this can be performed in many ways, including in the ways detailed later or yet in the specific way disclosed by paper "Bertram Drost, Slobodan Inc, *3D Object Detection and Localization using Multimodal Point Pair Features*, Conference on 3D Imaging, Modeling, Processing, Visualization and Transmission (3DIMPVT), 2012", in the specific way disclosed by paper "Bertram Drost, Markus Ulrich, Nassir Navab, Slobodan Inc, *Model Globally, Match Locally: Efficient and Robust 3D Object Recognition*, Conference on Computer vision and pattern recognition (CVPR), 2010" or in the specific way disclosed by European patent EP2385483, each time with the advantages known thereof. These three disclosures are thereby incorporated herein by reference. It is however proposed herein the following particularity.

The substantial equality between the value of the descriptor for the first couple and the value of the descriptor for the second couple is a substantial equality between a first integer and a second integer number. The first integer number corresponds to the value of the descriptor for the first couple. The second integer number corresponds to the value of the descriptor for the second couple. The first integer number and the second integer number are computed via a quantization mapping applied respectively to the value of the descriptor for the first couple and to the value of the descriptor for the second couple. Thanks to this specific equality underlying the equality comparison involved in the method, the method performs relatively fast. Indeed, substantial equality is assessed, thanks to the quantization, between integer values. Therefore, the method performs this assessment relatively fast, and this leads to efficiency in a context where many such comparisons need to be made (e.g. the number of candidate first couples and/or the number of candidate second couples being in examples higher than 1000, 5000 or 10000).

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Embodiments of the invention will now be described, by way of non-limiting example, and in reference to the accompanying drawings, where:

FIGS. 4, 5, 6, 7, 8, 9, 10, 11, 12, 13, 14, 15, 16, 17, 18, 19, 20, 21 and 22 illustrate the method.

DETAILED DESCRIPTION OF THE INVENTION

Figure 1:
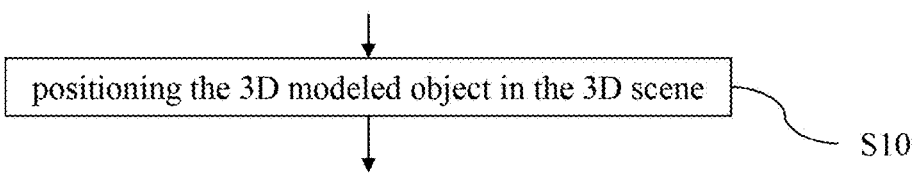
FIG. 1 shows a flowchart of an example of the method.

With reference to the flowchart of FIG. 1, it is proposed a computer-implemented method for localizing (i.e. outputting any information related to location of) a 3D modeled object (e.g. that represents a real object, e.g. a physical product, acquired via sensors or user-designed) in a 3D scene (e.g. that represents of a real environment, e.g. acquired via sensors), the 3D modeled object and the 3D scene each including respective 3D points (representative of the geometry/shape thereof, e.g. predetermined or determined within the method, e.g. based on another type of predetermined data), each 3D point being associated (i.e. linked, with specific linking data, e.g. a pointer or any other data that allows retrieving for each 3D point its respective associated data) to a respective normal vector (representative of surface normal to the geometry/shape thereof, e.g. predetermined or determined within the method, e.g. based on another type of predetermined data, for example the 3D points). The method comprises positioning S10 (i.e. any computation that determines data that describe rules/function which provide one or more 3D positions) the 3D modeled object in the 3D scene.

As further detailed later, the 3D modeled object represents an object (e.g. virtual or real object, such as a product, e.g. part or assembly of parts, such as a mechanical part or a consumer good) and it is any set of data that allows 3D representation thereof. The 3D scene is also a 3D modeled object, and it represents an environment (i.e. a set/assembly of objects and void space between them) where the object represented by the 3D modeled object (under localization by the method) may potentially be located. The 3D scene may be a virtual scene or a representation of a real scene (e.g. which potentially contains a version of the e.g. real-object represented by the 3D modeled object), for example comprising geometry acquired via physical sensors, for example RGB data and/or depth data and/or optical data (e.g. any 3D scene obtained via 3D reconstruction, such as structure-from-motion analysis and/or RGB-depth reconstruction or yet any other sensor-based 3D reconstruction). The method is for localizing a 3D modeled object (which may be obtained via any sensor-based 3D reconstruction, such as those mentioned earlier, or yet via a user designing the 3D modeled object e.g. with a CAD system) in such a 3D scene.

By "localizing", it is merely meant that the method outputs information about location of the 3D modeled object. Such output information derives from the result of the positioning S10, which "positioning" amounts determining (and/or testing and/or providing) at least one rule/function to position (said rule/function being also referred to as "positioning") the 3D modeled object in the 3D scene (in examples provided later, the "positioning" is a rigid motion i.e. translation and/or rotation referring to the fact that the 3D modeled object and the 3D scene are each associated to a respective e.g. orthonormal reference frame, that the frame respective to the 3D modeled object is positioned with respect to the frame respective to the 3D scene, e.g. in any way, e.g. arbitrarily, and that the positioning can thus amount to a rigid motion that "repositions" the frame respective to the 3D modeled object such that the 3D modeled object is correctly positioned in the 3D scene—this being performed in the specific way of the method). Such output information can be any information about the location of the 3D modeled object in the 3D scene (for example, the method may be used merely to recognize binary presence or not of the 3D modeled object in the scene). The information may comprise rules to position the 3D modeled object in the 3D scene, including for example at least one rigid motion (e.g. with reference to an initial—e.g. arbitrary, and/or predetermined or determined within the method—positioning of the 3D modeled object in the 3D scene). Several potential positions of the 3D modeled object may be provided. Also, the positioning S10 may result in the 3D modeled object being determined as not located in the 3D scene (thus, no positioning is output). Also, the method may determine confidence information (e.g. a level of confidence/significance associated to each potential position), or (e.g. systematically or when a confidence threshold is reached) output one or more optimal positioning (e.g. provided by S10). It is furthermore noted that the method may be executed on a single 3D modeled object, or repeatedly on different versions of a base 3D modeled object (e.g. at different scaling or with different modifications, the expression "3D modeled object" indifferently designating both the base version or modified version(s) thereof). These considerations are all well-known from the prior art of localizing a 3D modeled objection in a 3D scene.

In an example, the positioning S10 may amount to determining one or more best positioning functions for the 3D modeled object in the 3D scene, optionally with a respective level of significance, and the localizing may merely amount to outputting the result of the positioning S10, possibly after a filtering resulting from a decision step (e.g. the decision being based on a predetermined significance threshold, e.g. a threshold against which each level of significance is compared). Such a localization may have different well-known applications (i.e. the localization is performed prior or during e.g. real-time said applications).

In one application, the method may be used to augment virtual reality (e.g. in a markerless way, and e.g. real-time). The 3D scene is a virtual environment, and a 3D modeled object is localized therein (e.g. prior or simultaneously, that is, real-time, to a virtual reality method, e.g. including a user immersing in the virtual reality and/or interacting with it, such as moving therein). This localization can be used to add data (e.g. additional data—e.g. non-geometry data—related to the 3D modeled object, e.g. user-defined data, for example working on a CAD version of the modeled object and adding any type of information such as constraints, exact geometry and/or any data not obtainable directly by the sensor-based 3D reconstruction of a represented real object) to the virtual environment (i.e. the 3D scene), and thereby enrich the virtual reality (e.g. the virtual reality comprising only minimum data—e.g. geometry data only—about the modeled object before the augmentation). Thanks to the method performing a robust and accurate localization, this can all be performed markerless (i.e. without the 3D modeled object embedding any marker to help later localizing it). And thanks to the method performing relatively fast, this can be efficiently performed real-time. Marker versus markerless augmented reality refers to marker augmented reality, which is to place a special symbol in the real-world scene in order for the computer system to recognize this symbol so that the additional virtual objet can be inserted in the view of the real-world scene at the right place. Placing the predefined symbol in the real world scene is not always possible. Clearly, the method offers markerless capability.

In another application, the method can be applied to any structure-from-motion analysis 3D reconstruction. In a structure-from-motion analysis 3D reconstruction (i.e. physical data on a real object are acquired by dedicated sensors in order to reconstruct a 3D model of the object), if the data acquisition includes an interruption period, the method can help calibrating two acquisition periods separated by the interruption. At least a part of the data (i.e. 3D modeled object) acquired during one of the periods can indeed be localized in the 3D scene reconstructed based solely on the data acquired during the other period (i.e. "intermediate" reconstruction based on partial data), thereby achieving the calibration. This allows later considering/synchronizing both sets of data for a full 3D reconstruction. RGD-D data set may be when a 3D scene can be captured by using RGB-D camera. Such a device provides a RGB (red, green, blue) pixels image together with depth (D) information associated with each pixel. It is obtained by moving the camera according to a translational or circular motion during the capture process. If the camera motion is interrupted and restarted from a different position, the two resulting data sets are unconnected from the camera capturing point of view. The whole scanning must be restarted. This can be avoided by the method. Similarly, the method can be applied to synchronize 3D reconstructions performed concurrently, and thereby fuse the two 3D reconstructions so as to jointly use information thereof.

For example, the method can be implemented in any software product able to perform markerless augmented reality. Such a product can then feature the following characteristics: the software is robust to partial occlusion of the model in the scene, the computing time is linear with the size of the scene and the dependency coefficient is smaller than 1, the software is able to handle mirror symmetry, and/or points and normal vectors are involved, as opposed to a triangular mesh. The method may thus deal with augmented reality. This technology is to insert computer-generated virtual element (possibly a 3D object) into the 3D view of a real-world scene. Many applications take benefit of augmented reality: entertainment, tourism and sightseeing, gaming, furniture design, military. The method can be used as well similarly for RGB-D data set management software. Earlier-cited solutions of the prior art feature different issues. They make use of a descriptor that is invariant under mirror symmetries. Their software does not make the difference between a shape and its mirror shape. They could localize a mirrored model, instead of the model, into the scene. Furthermore, these solutions are questionable from the computing time points of view because they often perform an exhaustive investigation of all couples model/scene elements.

Whatever its output (as mentioned above), the positioning is performed (e.g. fully or semi automatically) following a specific algorithm, of the type known by earlier-cited prior art (several specificities of the algorithm followed by the positioning S10 and earlier-cited prior art positioning are provided later, with reference to an example of the method). Such a type of algorithm rewards, for each of first couples, a match with a respective second couple. This is now explained.

"Couples" refer to ordered pairs of points (with their associated normal vectors). These specific datasets processed by the method are conveniently referred in the following to as merely (first and/or second) "couples" or, for the sake of more convenience, "pairs" (i.e. disregarding the ordering aspect). The "first" couples relate to the 3D modeled object while the "second" couples relate to the 3D scene. In specific, the first couples are made of two 3D points of the 3D modeled object and their respective associated normal vectors, while the second couples are made of two 3D points of the 3D scene and its respective associated normal vectors.

Now, the positioning S10 tends to position (or "align") the 3D modeled object against the second couples in a "best way", for example in the specific ways described with reference to later-detailed examples. For now, it can be said that the positioning S10 follows an algorithm that considers theoretic positions, which can also be referred to as "explored" positionings. This is known for example from the field of optimization, where the algorithm may amount to solving an optimization program under specific constraints. Now, the algorithm may be any scheme that amounts to considering potential solutions (i.e. evaluating the relevance of theoretic positionings), and whenever the algorithm considers a positioning (theoretically) it rewards a specific condition of the positioning (or equivalently penalizes the condition being not met). This is all known per se from the field of optimization and algorithms, being noted that the method may implement such a rewarding in any way, and notably implicitly (as specific steps of the algorithm), i.e. with the algorithm going directly to a solution where the rewarding is implicitly performed (that is, rather than actually searching for an optimum, e.g. of an energy or the like). In other words, the rewarding may be "hidden" behind the predetermined choices performed by the algorithm.

In particular, for any given (theoretic) positioning of the 3D modeled object in the 3D scene contemplated by the positioning S10, the algorithm rewards the positioning in the following way. The algorithm rewards the fact that first couples are positioned substantially on respective second couples and the fact that for such first couples, each time the value of the descriptor is substantially equal to the value of the descriptor for the second couple. In other words, the method tends (i.e. "substantial" character of the contemplated equalities and imperfection character of a global optimization which is inherent to the real character of the scenario) to send (i.e. geometrical match) first couple (e.g. a maximum number of them) onto second couples, and to have such couples present the same descriptor value. Yet in other words, the algorithm penalizes first couples having no corresponding second couple on which they are positioned (or little correspondence with such second couples) and/or a second couple with which there is no (or little) descriptor value match. Now, as widely known, this can generally be performed in many different ways, including in ways described by the prior art, or alternatively with the specificity(ies) of example(s) of the method.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined. Notably, the positioning S10 may be performed fully automatically, following the algorithm, e.g. executed by a processor.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

By "database", it is meant any collection of data (i.e. information) organized for search and retrieval (e.g. a relational database, e.g. based on a predetermined structured language, e.g. SQL). When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semi-conductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging). The 3D scene may also be such a modeled object. However, the 3D scene typically represents a real scene, e.g. and thus the 3D comprises several such modeled objects assembled (or arranged) in a specific way, possibly with other type of modeled objects (e.g. representing landscape and/or spaces and/or buildings, such as factories and/or rooms and/or facilities).

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systemes under the trademark DELMIA®.

By CAE solution, it is additionally meant any solution, software of hardware, adapted for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systemes under the trademark SIMULIA®. Another growing CAE technique involves the modeling and analysis of complex systems composed a plurality components from different fields of physics without CAD geometry data. CAE solutions allows the simulation and thus the optimization, the improvement and the validation of products to manufacture. Such CAE solutions are provided by Dassault Systemes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systemes under the trademark ENOVIA®.

Figure 2:
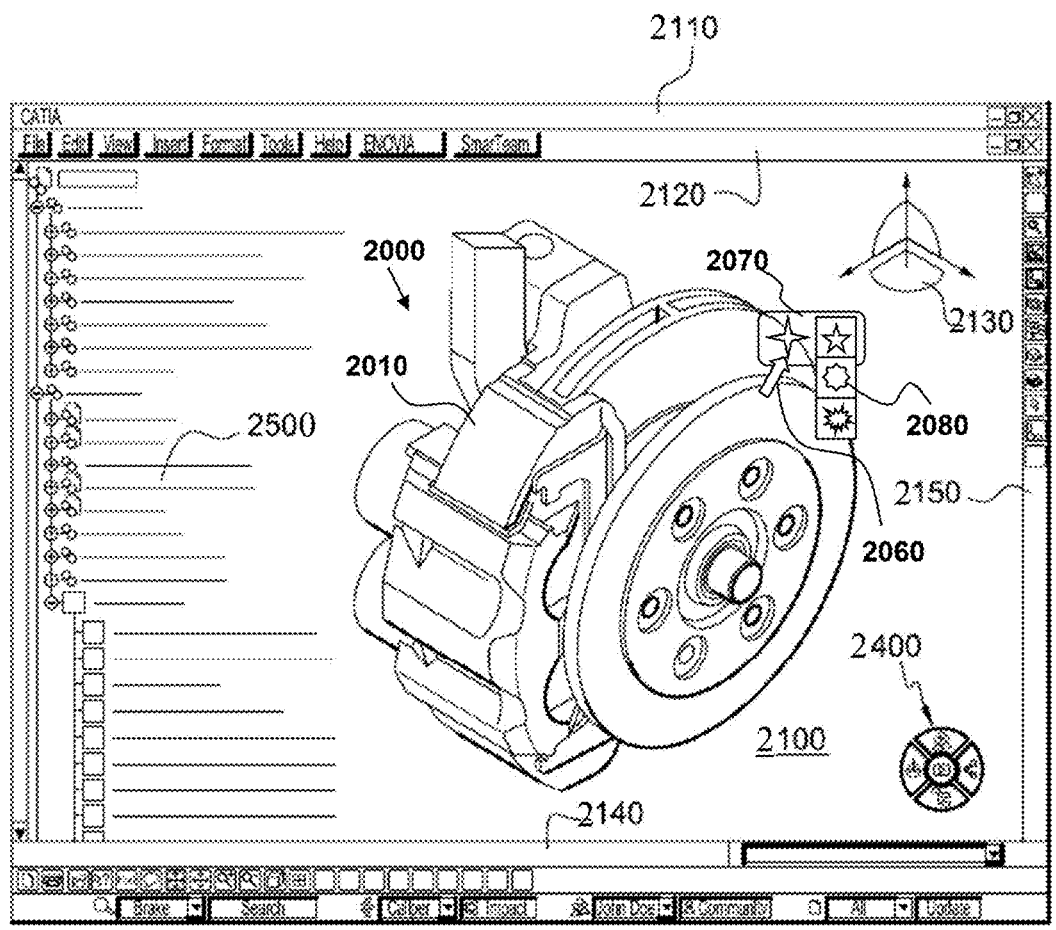
FIG. 2 shows an example of a graphical user interface of the system.

FIG. 2 shows an example of the GUI of a system, wherein the system is a CAD system, for example for the prior designing of the 3D modeled object then localized by the method.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of FIG. 2, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
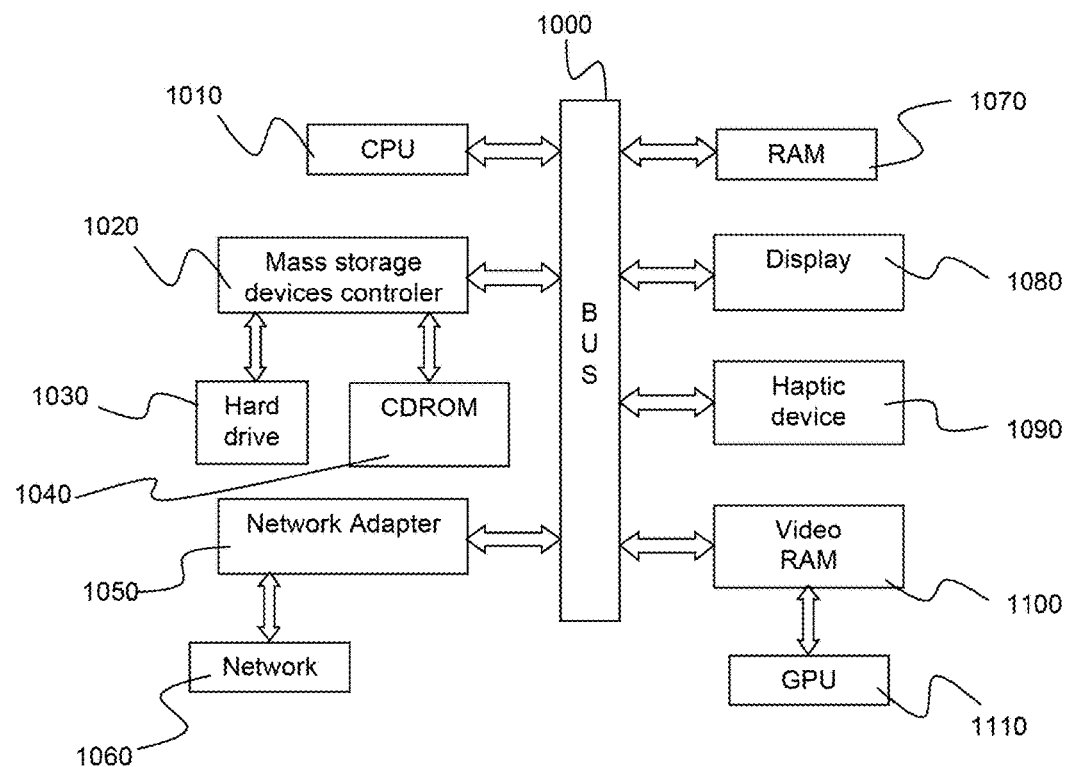
FIG. 3 shows an example of the system.

FIG. 3 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object.

Examples of the method are now discussed. Different options of the method are implemented by the examples, and detailed hereunder. The examples may be adapted so that not all options are implemented, and/or some options are slightly modified and implemented in a different way.

Figure 4:
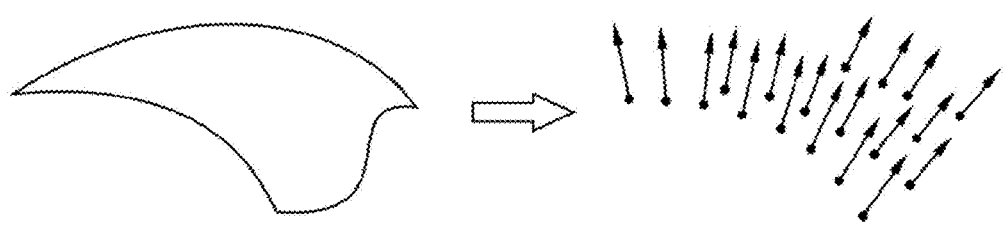
Figure 5:
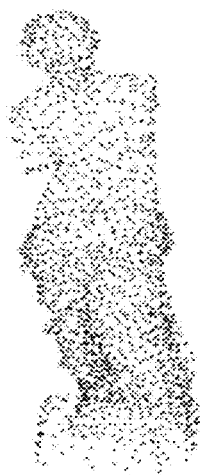
Figure 6:
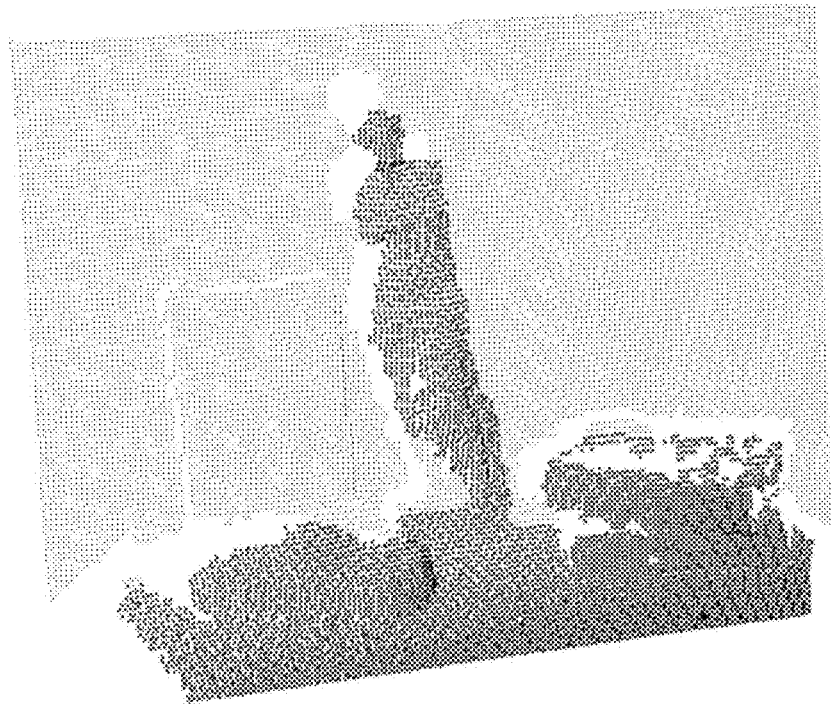

The method in the examples may locate a physical 3D detail, named the "model", into a broader physical 3D environment, named the "scene". Firstly, the 3D physical scene and model may be respectively converted into two finite sets of couples made of a point and a normal vector (e.g. starting from such already finite sets or by sampling corresponding infinite sets). In an example, points are sampled from the surface of the 3D scene and model. Normal vectors are those of the 3D scene and model surface at sampling points. FIG. 4 illustrates such a sampling. FIG. 5 illustrates sampling points of a typical model and FIG. 6 of a scene (the example of the figures incidentally showing that the representation of the statue on FIG. 5 i.e. 3D modeled object should indeed be found and positioned in the 3D scene of FIG. 6, because the statue is apparently present in the environment represented by the 3D scene).

Figure 7:
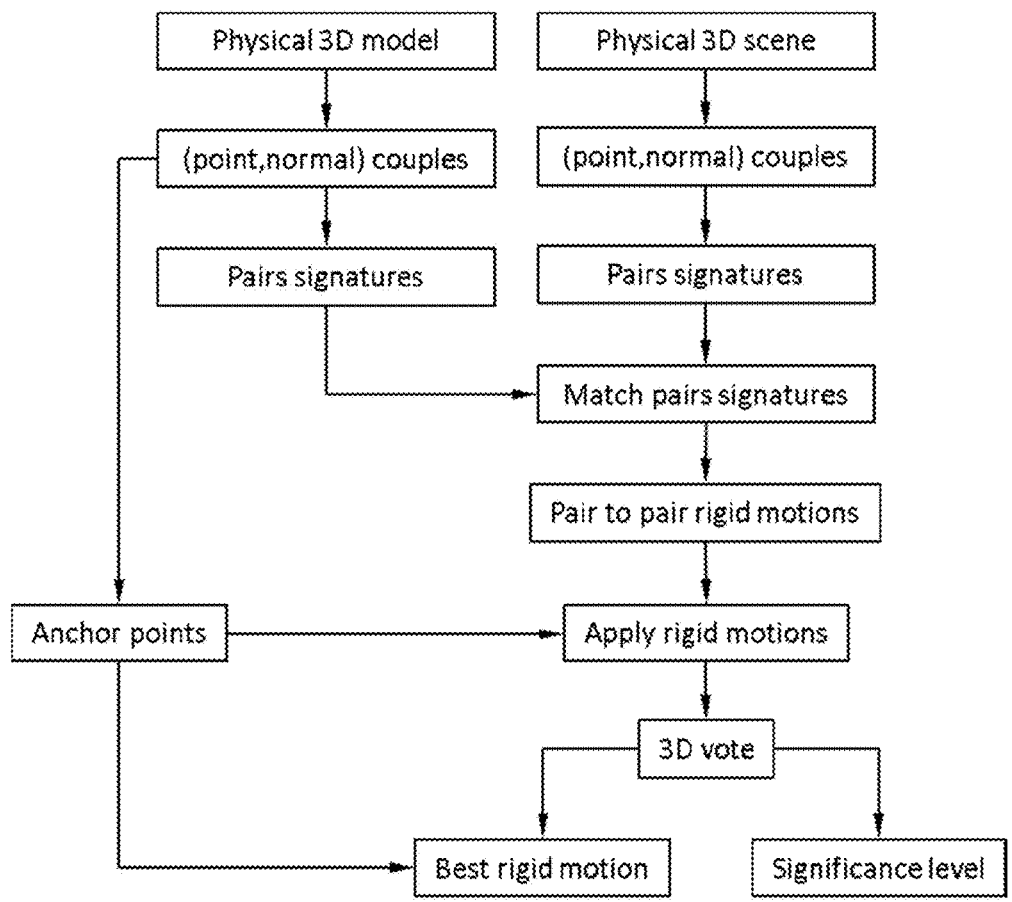

The object of interest for the method is a pair of (point, normal) couples, that is something like ((point,normal), (point,normal)). In examples described hereunder, among all rigid motions changing pairs of the model into pairs of the scene, the method may select the most frequent one, through a "3D vote" step. Choosing three points, named "anchor points", in the model, this selection may be done by storing all transformed anchor points by rigid motions changing a pair of the model into a pair of the scene. This is the "pair-to-pair rigid motion" step described later. The most frequent transformed anchor points disclose the most frequent rigid motion from which the "best rigid motion" may be computed. In addition, a "significance level" may be computed, for example for the user to decide whether the best rigid motion can be used in the following process. For performance purpose not all pair-to-pair rigid motions may be investigated. Only rigid motions changing a pair (of the model) into a similar pair (of the scene) may be considered. Similar pairs of a given pair may be gathered by using a numerical signature and stored in a dedicated data structure. This is the "pair signatures" matching described later. An example of the method featuring all these individual options is shown on the flowchart of FIG. 7.

Applied to structure-from-motion analysis, the method of the examples allows several things. When the camera scanning is interrupted, it can be restarted from a neighboring position so that a portion of the scene is shared by the consecutive datasets. The method can compute the correct repositioning of the two data sets by matching the shared portions. This makes the scanning process more robust since it can tolerate interruptions or motion perturbations. Markerless augmented reality is to insert the additional virtual object in the real-world view without the help of a pre-defined symbol. Applied to such context, the method of the examples can compute the appropriate insertion position of the virtual object. Compared to earlier-cited prior art, a major optional benefit of the method of the examples is the voting process that requires less computation while being as robust. Indeed, the method of the examples works with a fixed number of pairs of the scene whereas earlier-cited prior art works with a fixed number of "reference points" from which all possible pairs are taken into account. The method of the examples is able to discard "reference points" while maintaining and even improving robustness by (1) properly selecting the set of scene pairs to use, (2) having a direct method for computing the rigid transformation between two pairs and (3) having a method to globally vote for transformations (anchor points and hash table). Another differentiating point is that the fourth real number of the descriptor efficiently handles symmetry. Indeed, as opposed to earlier-cited prior art, two mirror-symmetrical pairs do not share the same descriptor in the method of the examples.

Figure 8:
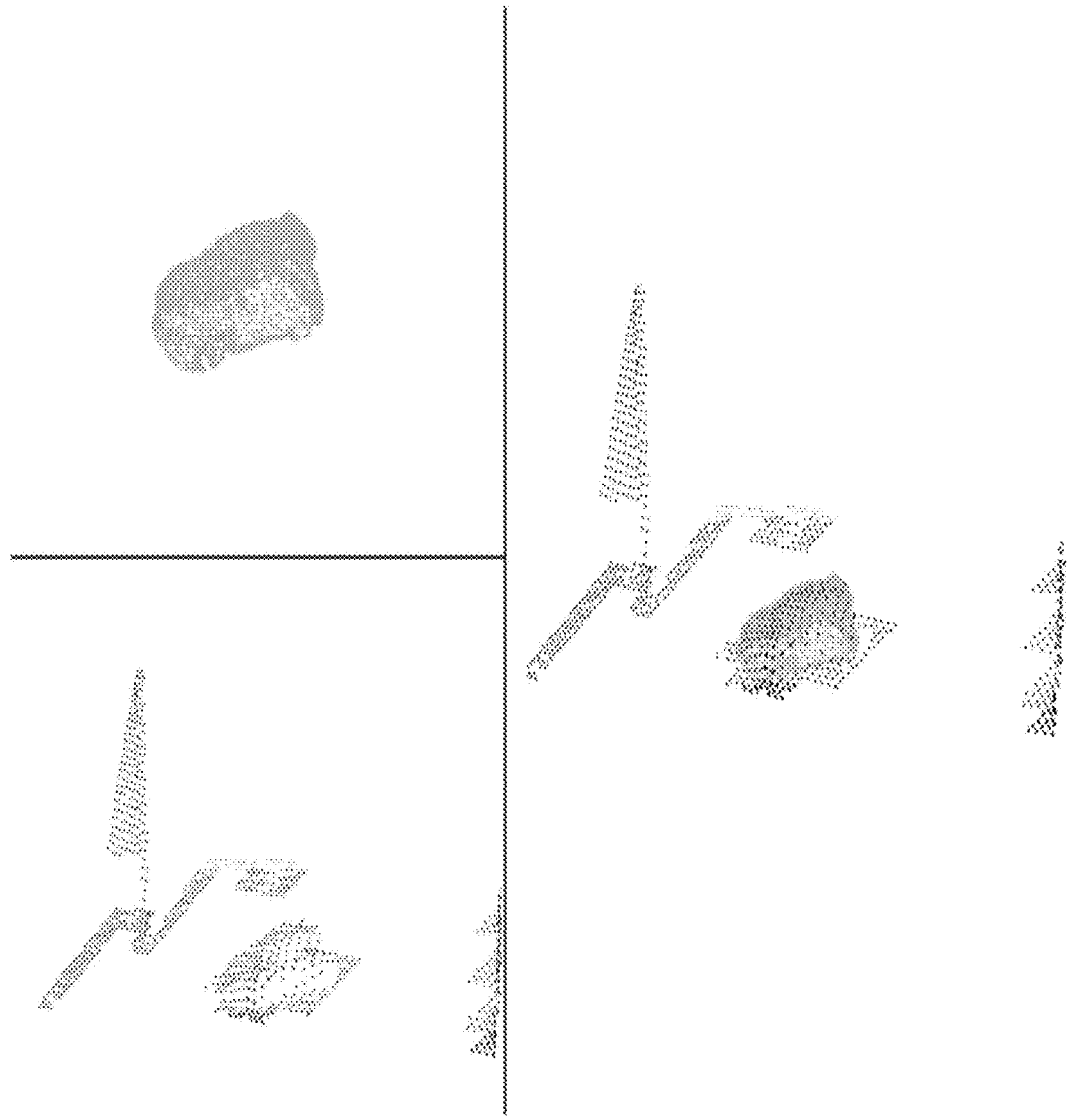
Figure 9:
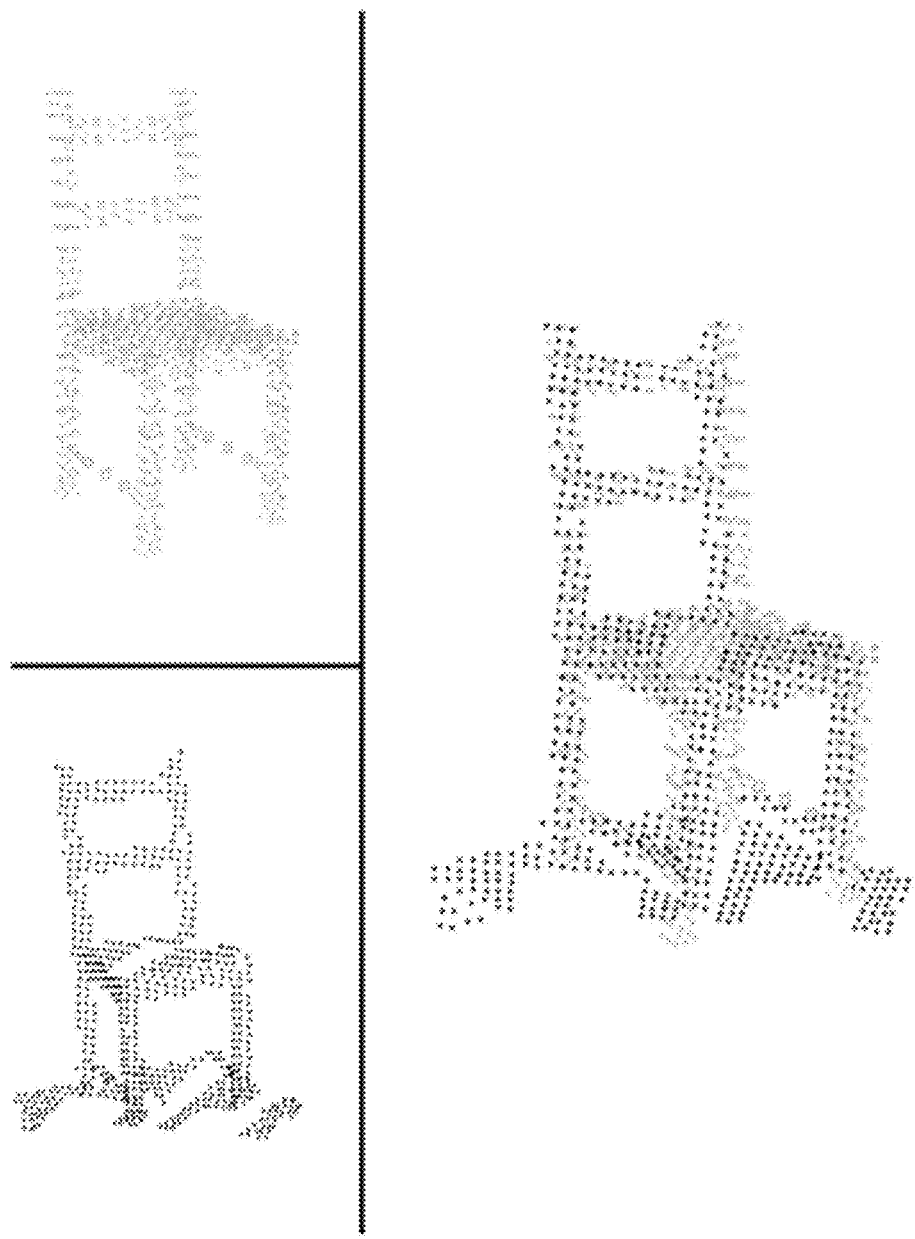
Figure 10:
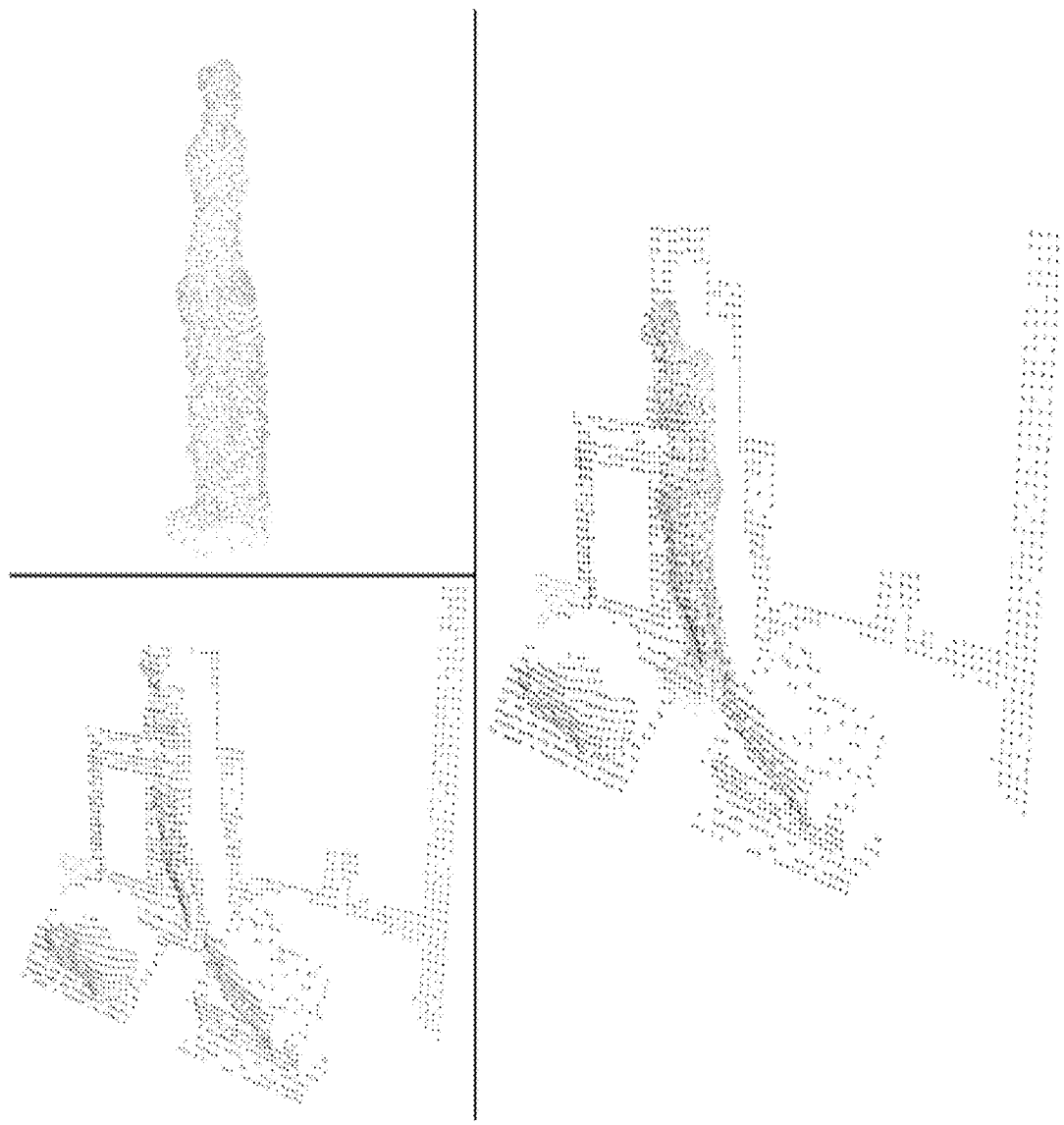

FIGS. 8-10 figures each show respectively three pictures. Up left picture is the 3D model, down left picture is the 3D scene and right picture is the model positioned in the scene (which display may thus be a further step of the method performed according to S10). All scenes and models are finite sets of 3D points. FIG. 8 shows a "car" model. FIG. 9 shows a "chair" model. FIG. 10 shows a "Venus" model.

The notion of "pair" (or "couple") is now discussed.

Noting $B=\{(x,y,z)\in\mathbb{R}^3, x^2+y^2+z^2=1\}$ the unit sphere, let $K=\mathbb{R}^3 \times B$ be the set of couples made of a 3D point and a normal vector. By definition, in the method of the examples, the model M and the scene S are finite subsets of K, meaning that $M=\{m_i, i=1, \ldots, |M|\}$ with $m_i\in\mathbb{R}^3 \times B$ for all i, and $S=\{s_i, i=1, \ldots, |S|\}$ with $s_i\in\mathbb{R}^3 \times B$ for all i. Let $P_M$ be the set of all couples of elements of M: $P_M=\{((p_1,n_1), (p_2, n_2)), (p_1,n_1)\in M, (p_2,n_2)\in M\}=M\times M$. Same for $P_S$: $P_S=\{((p_1, n_1), (p_2, n_2)), (p_1, n_1)\in S, (p_2, n_2)\in S\}=S\times S$.

Figure 11:
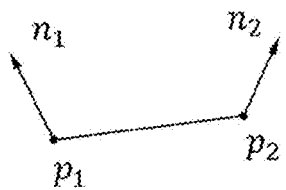

From the mathematical point of view, an element of $P_M$ or $P_S$ is a couple of point-normal couples, but, for clarity, it is named a "pair" in the following, which is also consistent with prior art wording. Clearly, it is not a "pair" from the mathematical point of view because the ordering of elements does matter, but this does not lead to any misunderstanding since the mathematical concept of a true pair is not used in the following discussions. FIG. 11 illustrates a typical pair.

One example of the algorithm and how it performs the earlier-mentioned rewarding is now discussed.

The algorithm followed by the positioning S10 may run through (i.e. iterate on) second couples (unlike earlier-cited prior art algorithms which run through first couples and can be very quickly prohibitive), access all first couples that match a respective second couple under run, and output a positioning of the 3D modeled object in the 3D scene that rewards the first couple being positioned substantially on the accessed respective second couple. In other words, the positioning architecturally starts from second couples of the 3D scene and considers candidate first couples (i.e. those of the 3D modeled object that can be substantially positioned on each second couple considered), and translate those candidates into candidate positionings. This architecture reduces computing time.

Notably, the second couples through which the algorithm runs are (e.g. formed by/respective to) a representative subset of the respective 3D points included in the 3D scene.

In other words, instead of running through all the second couples, the algorithm runs on a subset thereof (i.e. that corresponds to the representative subset of the respective 3D points included in the 3D scene). By "representative", it is meant that the second couples represent the geometry of the scene, with a reduced quantity of information (relative to the initial sampling). In specific, the representative subset is obtained from a downsizing (i.e. a selection) of the respective 3D points included in the 3D scene, the downsizing including a spatial clustering (e.g. a K-means clustering) of the respective 3D points included in the 3D scene and a probabilistic selection based on the result of the clustering. In other words, the 3D points of the 3D scene are clustered, and probabilities are assigned to clusters, and the method performs a random selection (e.g. pseudo-random) based on the assigned cluster probabilities. The probabilities may be such that the probabilistic selection rewards large clusters and/or close clusters (the term "close" here referring to a distance evaluated from a reference position, which may be position of the camera in case the 3D scene is a virtual reality environment—i.e. point of view of the immersed user, e.g. and the method is performed—e.g. real-time—while the user is involved in a virtual reality immersion process and interacts with the virtual environment).

An example of such downsizing of the magnitude of $P_S$ that leads to particularly accurate final results in a particularly efficient manner (from the computational point of view) is now discussed. The example refers to a camera position. In case the camera position is not provided, the example can be adapted by removing the related term (and performing a general spatial clustering). The goal of the clustering of the example is primarily to have a homogenous distribution of the couples and to group couples likely to belong to a same object.

The number of elements in S is can be very large and much larger than the number of elements in M, same for $P_S$ and $P_M$. For performance purpose, only a randomly selected subset of $P_S$ is taken into account in the example. Set $P_S$ is downsized to the number of points of the model, that is $|P_S| \approx |M|$. Typical downsized value is $|P_S| \approx 10\,000$ and typical model size is $|M| \approx 20\,000$. The downsizing of the example is performed through a clustering step of set S followed by a random selection step of elements of $P_S$. As previously defined, elements of S are couples made of a 3D point and a normal vector. Normal vectors are not used in the downsizing process of the example, so the wording "a point of S" refers to the 3D point only. The clustering step of the example is based on the k-means clustering algorithm, for example as described in paper "Tapas Kanungo, David M. Mount, Nathan S. Netanyahu, Christine D. Piatko, Ruth Silverman, and Angela Y. Wu, *An Efficient k-Means Clustering Algorithm: Analysis and Implementation*, IEEE Transactions on Pattern Analysis and Machine Intelligence, Vol. 24, No 7, July 2002". The inputs are the number N of clusters (between 2 and 5, for example 3, being an experimentally good value) and the set of points S. The outputs are N non empty and disjoint subsets $C_i$, $i=1, \ldots, N$, named the clusters, and as many 3D points $m_i = (x_i, y_i, z_i)$, $i=1, \ldots, N$, named the mean points, respectively associated with the $C_i$. Outputs are computed in such a way that the following properties are satisfied. Firstly, $S = C_1 \cup \ldots \cup C_N$. Secondly, all points $m \in C_i$ are closer to average point $m_i$ than to any other average point $m_j$ with $j \neq i$. That is, for all $i=1, \ldots, N$ and all $m \in C_i$: $\|m - m_i\| < \min\{\|m - m_j\|, j \neq i\}$. The number of points in each cluster $C_i$ is noted $n_i$. Mean points are computed by the k-means clustering algorithm, they do not belong to S. The reference axis system used for clustering is defined in such a way that the z coordinate is the distance to the camera and that $z_i > 0$ for all i. In the context of the examples, the typical number of clusters is 3.

Figure 12:
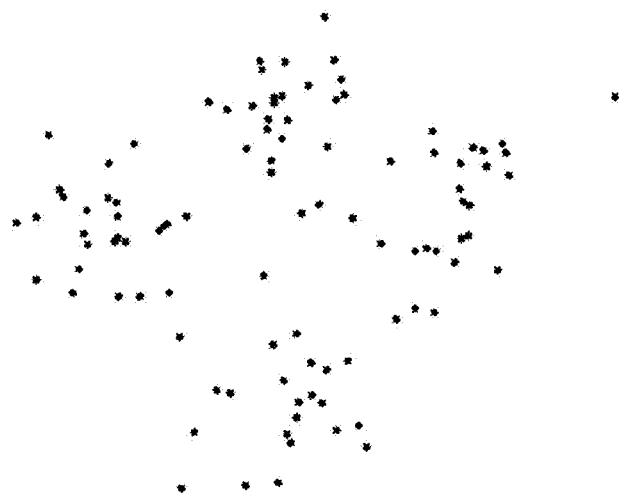
Figure 13:
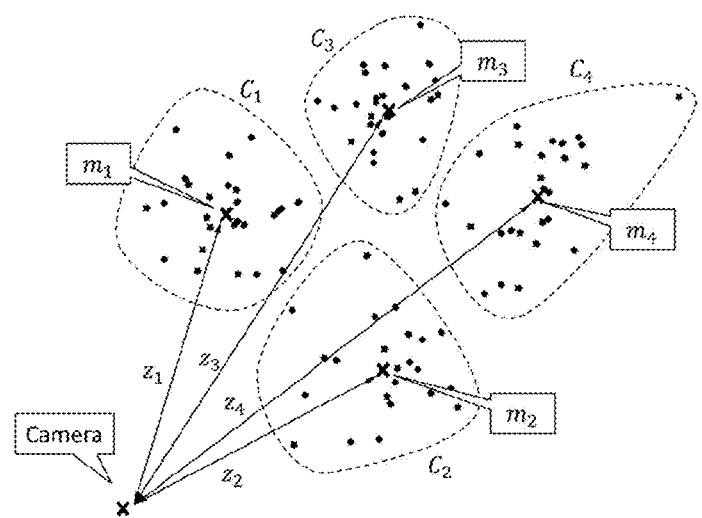

FIG. 12 illustrates an exemplary set of 2D points. FIG. 13 illustrates its k-means clustering into four clusters $C_1$, $C_2$, $C_3$, $C_4$ together with average points $m_1$, $m_2$, $m_3$, $m_4$ and the camera position. The random selection step of the example is performed as follows. The entire set S is involved by noting $C_{N+1} = S$. Then, for $i=1, \ldots, N+1$, a probability $p_i \in [0,1]$ is associated with each $C_i$ according to the following formulas, Firstly $p_{N+1} = 1/10$. Then a normalization coefficient $$p_0 = \frac{(1 - p_{N+1})}{\sum_{i=1}^{N} \frac{z_1}{z_i} n_i^2}$$

and finally the probability $$p_i = p_0 \frac{z_1}{z_i} n_i^2$$

for all $i \in \{1, \ldots, N\}$. Coefficient $p_0$ is designed so that $p_1 + \ldots + p_{N+1} = 1$. Probability $p_i$ is proportional to the square $n_i^2$ of number of points in $C_i$, and it is inversely proportional to its depth $z_i$. This way, given two clusters having the same number of points, the most probable is the one that is closer to the camera. Furthermore, given two clusters having the same depth, the most probable is the one featuring the largest number of points. Finally, the probability of set $C_{N+1}$ does not vanish so that pairs having points in distinct clusters are selected.

Let $N_p$ be the number of pairs to select in $P_S$. The selection algorithm makes use of a random generator of integer numbers in set $\{1, \ldots, N+1\}$ according to the probability defined in previous paragraph. It is noted RandProb. Each call to RandProb yields a new integer value. Given integer numbers a and b, the algorithm makes also use of a random generator of integer numbers in arbitrary set $\{a, a+1, \ldots, b\}$ according to the uniform probability. It is named Rand(a, b). Each call to Rand(a, b) yields a new integer value. The selection algorithm may be as follows.

```
For i := 1 to N_p do begin
    j := RandProb
    k_1 := Rand(1,n_j)
    k_2 := Rand(1,n_j)
    The i-th selected pair includes points number
        k_1 and point number k_2 of C_j
End for
```

For simplicity, downsized set $P_S$ is still noted $P_S$.

In an example, the method may (also) include a pair preprocessing. The preprocessing may notably clean $P_M \cup P_S$ (i.e. removes for the later processing) from couples $((p_1, n_1), (p_2, n_2))$ where $p_2$ is relatively close to $p_1$—e.g. with respect to a predetermined threshold—or $n_1$ is relatively close to collinear to $p_2 - p_1$—e.g. with respect to a predetermined threshold.

In this example, for efficiency purpose, sets $P_M$ and $P_S$ are cleaned by removing meaningless pairs. A meaningless pair $((p_1, n_1), (p_2, n_2))$ is such that the distance between $p_1$ and $p_2$ is inappropriate or such that $n_1$, $n_2$ and $p_2 - p_1$ are almost collinear.

A first preprocessing may remove pairs of $P_M$ and $P_S$ featuring a too large or a too small $\|p_2-p_1\|$. Precisely, this is done by computing:

$$w=\max\{\|p_2-p_1\|,\{(p_1,n_1),(p_2,n_2)\}\in P_M\}$$

$$r_1^{min}=wk_{min}$$

$$r_1^{max}=wk_{max}$$

where $k_{min}=0.1$ and $k_{max}=0.6$. Then, only pairs $((p_1, n_1), (p_2, n_2))\in P_M\cup P_S$ such that: $r_1^{min}\le\|p_2-p_1\|\le r_1^{max}$ are kept for further processing.

According to a second preprocessing, only pairs $((p_1, n_1), (p_2, n_2))\in P_M \cup P_S$ satisfying the following relationship may be kept:

$$\left|\det\left[n_1, n_2, \frac{p_2-p_1}{\|p_2-p_1\|}\right]\right| > k$$

Notation $\det[u, v, w]$ is the 3×3 determinant of vectors u, v, w∈$\mathbb{R}^3$. A typical value for threshold k is k=0.2 (this can be modified ±50%). Sets $P_M$ and $P_S$ used in the following may satisfy the properties defined by the preprocessing.

The notion of signature is now discussed.

A numerical signature may be defined for pairs according to the following process. A pair may be changed into a four-tuple of real numbers, named the "descriptor", which in turn can be changed into an integer number. The signature may in such a case refer to the a combination of both, as explained in the following.

The descriptor of an example of the method is first discussed.

In this example, the descriptor is variable under mirror symmetries, thanks to a specific term. This allows a reduction of false positives, with respect to earlier-cited prior art.

Given $((p_1, n_1), (p_2, n_2))\in P_M \cup P_S$, the descriptor may be computed according to mapping F: $P_M\cup P_S\to\mathbb{R}$ defined by $q=p_2-p_1$ and:

$$F(p_1, n_1, p_2, n_2) = \begin{pmatrix} \|q\| \\ \left\langle n_1 \mid \frac{q}{\|q\|}\right\rangle \\ \left\langle n_2 \mid \frac{q}{\|q\|}\right\rangle \\ \det\left[n_1, n_2, \frac{q}{\|q\|}\right] \end{pmatrix}$$

Where $\langle u|u\rangle$ is the scalar product of vectors u and v. Mapping F is invariant under rigid motion, just like earlier-cited prior art, but it is not invariant under mirror symmetry, as opposed to earlier-cited prior art. Indeed, noting L the mirror symmetry linear mapping, the fourth coordinate of the mirrored pair descriptor may be:

$$\det\left[Ln_1, Ln_2, \frac{Lq}{\|Lq\|}\right] = \det\left[Ln_1, Ln_2, L\frac{q}{\|q\|}\right]$$

$$= (\det L)\left(\det\left[n_1, n_2, \frac{q}{\|q\|}\right]\right)$$

$$= -\det\left[n_1, n_2, \frac{q}{\|q\|}\right]$$

because det L=1.

The descriptor (the specific descriptor of the above example, or any other such descriptor) may be in an example quantized, which leads to fast performance of the equality evaluations (where needed). Such quantization is now discussed.

Generally, the substantial equality between the value of the descriptor for the first couple and the value of the descriptor for the second couple may be seen as a substantial integer equality. In specific, it may be a substantial equality between a first integer number corresponding to the value of the descriptor for the first couple and a second integer number corresponding to the value of the descriptor for the second couple, and in such a case the first integer number and the second integer number may be computed via a quantization mapping applied respectively to the value of the descriptor for the first couple and to the value of the descriptor for the second couple. This greatly speeds up the process, as only integer equalities are contemplated (whereas real number comparison can take time).

A specific way to perform such quantization efficiently and with relatively high accuracy (for the final result) is now discussed.

Let $H=F(P_M\cup P_S)$ be the finite set of all 4-tuples $F(p_1, n_1, p_2, n_2)$ when $((p_1, n_1), (p_2, n_2))\cup P_M\cup P_S$. By nature $H\subset\mathbb{R}$. Each element of H is changed into an integer number by using a quantization mapping Q:H→$\mathbb{N}$. This mapping is defined as follows. There exists eight real numbers $r_i^{min}$ and $r_i^{max}$ with i=1, . . . , 4 such that, for i=1, . . . , 4 and all $(r_1, r_2, r_3, r_4)\in H$ $$r_i^{min}\le r_i\le r_i^{max}$$

Indeed, real numbers $r_2$ and $r_3$ are scalar products of normalized vectors, so $-1\le r_2\le 1$ and $-1\le r_3\le 1$. Real number $r_4$ is the determinant of normalized vectors so $1\le r_4\le 1$. (In other words, −1 and +1 may be retained for $r_i^{min}$ and $r_i^{max}$ with i=2, 3, 4, although a more precise minimum and/or a more precise maximum may also be determined, as for $r_1$). Finally, number $r_1$ is such that $r_1^{min}\le r_1\le r_1^{max}$ where $r_1^{min}$ and $r_1^{max}$ may be defined by the earlier-mentioned preprocessing of an example.

Four real numbers $\varepsilon_i$, i=1, . . . , 4, named the "resolutions" are contemplated. Typical values are as follows:

$$\varepsilon_1=0.05(r_1^{max}-r_1^{min})$$

$$\varepsilon_2=0.1$$

$$\varepsilon_3=0.1$$

$$\varepsilon_4=0.08$$

Tests have shown that range efficiency of resolution numbers is ±50% around these nominal values (i.e. the method may contemplate for each of the four numerical values provided above a value differing by a variation within ±50%). Also, it is noted that values of $\varepsilon_i$, i=2, 3, 4 may be made similar to $\varepsilon_1$ in case more precise values than −1 and +1 are retained for $r_i^{min}$ and $r_i^{max}$.

Noting [r] the greatest integer number less than or equal to the real number r, define integer numbers $\delta_i$ for i=1, . . . , 4:

$$\delta_i = \left[\frac{r_i^{max}}{\varepsilon_i}\right] - \left[\frac{r_i^{min}}{\varepsilon_i}\right]$$

Now, given an arbitrary $(r_1, r_2, r_3, r_4)\in H$, define integer numbers $q_i$ for i=1, . . . , 4:

$$q_i = \left[\frac{r_i}{\varepsilon_i}\right] - \left[\frac{r_i^{min}}{\varepsilon_i}\right]$$

Then, the quantization of the 4-tuple $(r_1, r_2, r_3, r_4) \in H$ is defined by:

$$Q(r_1,r_2,r_3,r_4) = q_1\delta_2\delta_3\delta_4 + q_2\delta_3\delta_4 + q_3\delta_4 + q_4$$

Finally, the signature is the quantized descriptor, that is the mapping $\sigma: P_M \cup P_S \to H \to \mathbb{N}$ defined by composition $\sigma = Q \circ F$ and meaning that for all $((p_1, n_1), (p_2, n_2)) \in P_M \cup P_S$:

$$\sigma((p_1,n_1),(p_2,n_2)) = Q(F(p_1,n_1,p_2,n_2))$$

For example, choosing $r_1^{min} = 0.6$, $r_1^{max} = 200$ and pairs (shown on FIGS. 14-17):

$$a_1 = \left(\begin{pmatrix}1\\0\\0\end{pmatrix}, \begin{pmatrix}1\\0\\0\end{pmatrix}, \begin{pmatrix}0\\1\\0\end{pmatrix}, \begin{pmatrix}0\\0\\1\end{pmatrix}\right) \quad a_2 = \left(\begin{pmatrix}1\\0\\0\end{pmatrix}, \begin{pmatrix}0\\1\\0\end{pmatrix}, \begin{pmatrix}0\\0\\1\end{pmatrix}, \begin{pmatrix}0\\0\\1\end{pmatrix}\right)$$

$$a_3 = \left(\begin{pmatrix}1\\0\\0\end{pmatrix}, \begin{pmatrix}0\\0\\1\end{pmatrix}, \begin{pmatrix}0\\0\\0\end{pmatrix}, \begin{pmatrix}0\\-1\\0\end{pmatrix}\right) \quad a_4 = \left(\begin{pmatrix}1\\0\\0\end{pmatrix}, \begin{pmatrix}0.999995\\0.003141\\0\end{pmatrix}, \begin{pmatrix}0\\1\\0\end{pmatrix}, \begin{pmatrix}0\\0\\1\end{pmatrix}\right)$$

The computation yields:

$\sigma(a_1) = 1054$ $\sigma(a_2) = 5250$ $\sigma(a_3) = 5250$ $\sigma(a_4) = 1054$ Notice that $\sigma(a_1) = \sigma(a_4)$ because pair $a_1$ is close to pair $a_2$. Furthermore, $\sigma(a_2) = \sigma(a_3)$ since $F(a_2) = F(a_3) = (1,0,0,-1)$ because pairs $a_2$ and $a_3$ are isometric and because mapping F is invariant under rigid motions.

An example of the method that allows a fast performance of the method is now discussed. In this example, the algorithm follows to a 3D vote principle (i.e. a hash table is used and the output of the algorithm corresponds to one or more slots of the hash table which are the most popular). In specific, the algorithm may correspond to a best vote among all positionings (e.g. rigid motions) that each position a respective first couple on a respective matching second couple. Then, the best vote may correspond to a hash table slot retaining the largest group of positionings that position in substantially the same way three so-called "anchor points" of the respective 3D points included in the 3D modeled object (that is, the positioning of the group send the anchor points to the same slot of the hash table, which is thus a 3x3D hash table, e.g. predetermined, a slot thereby being a cell of such a predetermined 3x3D grid). In other words, positionings that position a first couple onto a matching second couple (e.g. the "matching" being respective to the shape descriptor mentioned earlier, and in an example more particularly to the signature) are considered couple-wise (e.g. in specific, second-couple-wise, as mentioned earlier with reference to an example). All such candidate positionings are retained, and the most "popular" one(s) is(are) contemplated. This allows a fast determination of the positioning S10. The anchor points may be three unaligned points that belong to the 3D modeled object. This provides robustness to the 3D vote.

An example of anchor points that was tested and works particularly well is now discussed. In this example, the anchor points are three points of model M, noted $A = (m_1, m_2, m_3)$, chosen in such a way that their mutual distances are as large as possible. Precisely: $\max\{\|m_1-m_2\|^2 + \|m_1-m_3\|^2 + \|m_2-m_3\|^2; (m_1, n_1), (m_2, n_2), (m_3, n_3) \in M\}$. Notice that normal vectors $n_1$, $n_2$ and $n_3$ respectively associates with points $m_1$, $m_2$ and $m_3$ are not involved in this anchor points definition.

An example of the overall algorithm in line with the above-detailed examples is now discussed. The outline of the algorithm is as follows. A first step is to store in table $T(\cdot)$ how pair-to-pair rigid motions d change the anchor points A. For performance purpose, this step may investigate couples of pairs having the same signature, as mentioned by instruction 03 below:

```
00   i := 0
01   For all y ∈ P_S do begin
02       k := σ(y)
03       For all x ∈ P_M such that σ(x) = k do begin
04           Compute d ∈ SE(3) such that d(x) is close
                 to y.
05           i := i + 1
06           T(i) := d(A)
07       End for
08   End for
09   i_max := i
```

Integer $i_{max}$ is the number of pair-to-pair rigid motions investigated by the algorithm. Output table T gathers all transformed anchor points by using the said rigid motions. Let $Im(T)$ be the set of all values of T, that is $$Im(T) = \{T(i), i \in \{1, \ldots, i_{max}\}\}$$

A second step identifies the most frequent rigid motion in the following sense. Let $\varepsilon > 0$ be a numerical threshold. The value $\varepsilon$ is discussed later. Consider an arbitrary $t \in Im(T)$. Note $C(t, \varepsilon)$ the set of indexes i in $\{1, \ldots, i_{max}\}$ such that $T(i)$ is close to t. Precisely, $C(t, \varepsilon) = \{i \in \{1, \ldots, i_{max}\}, \|T(i)-t\| \le \varepsilon\}$.

By definition, the selected value $t^*$ in $Im(T)$ has the largest $C(t, \varepsilon)$, that is $t^* = \text{ArgMax}_{t \in Im(T)} |C(t, \varepsilon)|$. Notice that this "argument of maximum" formulation is generic. An example algorithm is described later. The last step returns the best rigid motion positioning/locating model M in scene S. It is the rigid motion $d^* \in SE(3)$ such that $\|t^* - d^*(A)\|$ is as small as possible. An example of the computation of $d^*$ is detailed later.

A specific example of the data structure retained for pairs signature matching (used at step 03 of the above example algorithm) is now discussed. In this example, the result of applying the quantization mapping to the value of the descriptor for first couples is stored in an indexed table, so as to increase overall efficiency of the method.

Indeed, retrieving all elements of $P_M$ having a given signature may be intensively used in the algorithm. It is for instance captured at instruction 03 of the above example by "For all $x \in P_M$ such that $\sigma(x) = k$ do begin". From the programming point of view, this operation is performed with the help of an appropriate data structure. This data structure involves three tables $T_1$, $T_2$ and $T_3$ and may be computed as follows.

The first step is to compute table $T_1$ such that $T_1(k)$ is the number of elements $x \in P_M$ such that $\sigma(x) = k$. Table $T_1$ is initialized with $T_1(i) = 0$ for all i.

```
n := 0
For all x ∈ P_M do begin
    k := σ(x)
    T_1(k) := T_1(k) + 1
    n := max{n, k}
End for
```

After this step, integer n is such that $1 \leq \sigma(x) \leq n$ for all $x \in P_M$. This means that $\sigma(P_M) \subset \{1, \ldots, n\}$. Notice that $\sigma(P_M) = \{1, \ldots, n\}$ is not required, meaning that there may exist some values of $\{1, \ldots, n\}$ that are not signatures of elements of $P_M$. In other words, there may exist integers i such that $T_1(i)=0$.

The second step is to compute table $T_2$, which is a directory of addresses in (future) table $T_3$. The size of table $T_2$ is n. Table $T_1$ is not used anymore after this step.

```
T_2(1) := 1
For i := 2 to n do begin
    T_2(i) := T_2(i - 1) + T_1(i - 1) + 1
End for
```

The last step is to feed table $T_3$ with lists of elements having the same signature. The size of table $T_3$ is $n+|P_M|$ and it is initialized with $T_3(i)=0$ for all $i \in \{1, \ldots, n+|P_M|\}$.

```
For all x ∈ P_M do begin
    k := σ(x)
    i := T_2(k)
    T_3(i) := T_3(i) + 1
    T_3(i + T_3(i)) := x
End for
```

This data structure may be used as follows. Given an element of the scene $y \in P_S$ and $k=\sigma(y)$ its signature, the number m of model elements $x \in P_M$ having the same signature k is read at place $T_2(k)$ in table $T_3$, that is $m=T_3(T_2(k))$. The said model elements are located in table $T_3$ at places $T_3(T_2(k)+j)$ for $j=1, 2, \ldots, m$.

This computation is clearly optimal because the size of the resulting data structure is $n+|P_M|$ and the cumulated complexity of the tree steps is $n+2|P_M|$. The table of FIG. 18 exemplifies the data structure with $P_M=\{a, b, c, d, e, f\}$ so that $|P_M|=6$, $\sigma(a)=\sigma(b)=\sigma(d)=\sigma(e)=2$ and $\sigma(c)=\sigma(f)=4$ so that $n=4$. The number of elements of $P_M$ having signature value 3 is $T_3(T_2(3))=T_3(7)=0$. The number of elements of $P_M$ having signature value 2 is $T_3(T_2(2))=T_3(2)=4$ and they are $T_3(3)=a$, $T_3(4)=b$, $T_3(5)=d$ and $T_3(6)=e$.

An example of the algorithm which yet increases global speed (while leading to relatively accurate results) is now discussed. In this example, the algorithm corresponds to a best vote among all rigid motions that each position a respective first couple on a respective matching second couple, as mentioned in an earlier example. Now, each rigid motion is determined (i.e. computing the pair-to-pair rigid motion, e.g. step 04 of the above example algorithm) in a specific and fast way: based exclusively (i.e. no other data involved in the determination) on a respective orthonormal axis system attached to its respective first couple and on a respective orthonormal axis system attached to its respective second couple. The respective orthonormal axis systems are each determined from respectively the respective first couple and the respective second couple based on only one of the two points and its respective associated normal vector (in other words, for each considered pair of couples, a rigid motion between them is determined exclusively based on two orthonormal systems, one per respective couple, and each system is determined exclusively based on half the information/data that defines the couple, that is, the position of one of the two points of the couples and the associated normal vector i.e. the position of the other point and the associated normal vector being not used), such that the determination is fast and thus the algorithm is globally fast as well.

An example of such rigid motion determination, which synergistically cooperates particularly well with the earlier-mentioned preprocessing example (because such preprocessing leaves couples which are inputs where this example of the determination is particularly fast) is now discussed.

In this example, computing the rigid motion is performed at instruction 04 of the algorithm: given a, a' two pairs, compute the rigid motion d such d(a) is close to a' in some sense. The principle is to define two direct and orthonormal axis systems (O,U,V,W) and (O',U',V',W') respectively attached to pair a and to pair a', then to compute rigid motion d changing (O,U,V,W) into (O',U',V',W'). Precisely, rigid motion d is such that, for all $x \in \mathbb{R}^3$, $d(x)=Cx+D$ with rotation C defined by the matrix product: $C=[U' \ V' \ W']^T[U \ V \ W]$. And translation D defined by: $D=O'-CO$. The axis system (O,U,V,W) attached to a pair $((p_1, n_1), (p_2, n_2))$ is defined as follows. The first vector U is $U=n_1$. The second vector V is the normalized projection of $p_2-p_1$ on the plane perpendicular to U. This is computed in two steps $V:=(I-UU^T)(p_2-p_1)$, where I is the identity matrix, and $$V := \frac{V}{\|V\|}.$$

Figure 19:
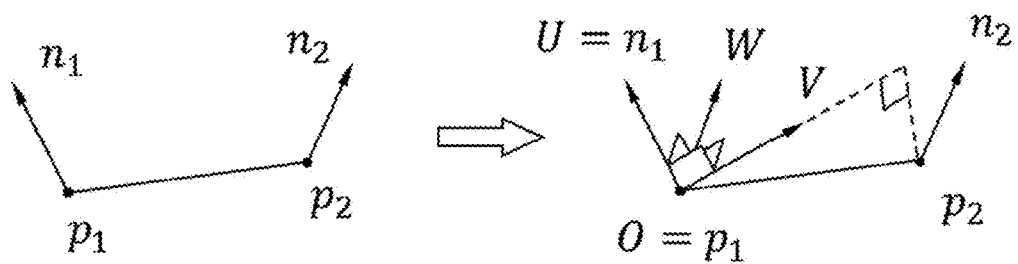
Figure 20:
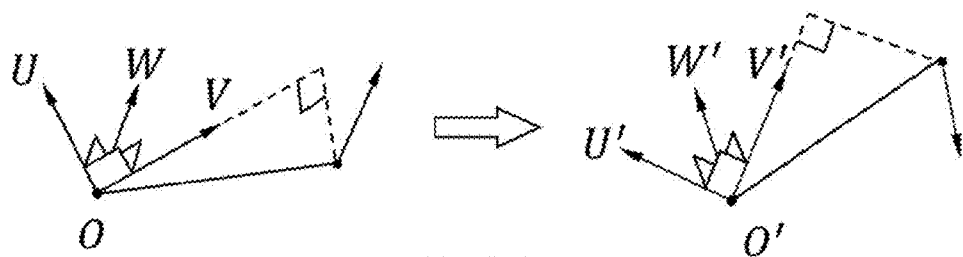

Thanks to the preprocessing, this computation is effective because $p_2 \neq p_1$ and $n_1$ is not collinear to $p_2-p_1$. The third vector W is the cross product $W=U \times V$. Finally the origin O is $p_1$. FIG. 19 illustrates the axis system definition. Despite the axis system (O,U,V,W) does not depend on $n_2$ and on the length $\|p_2-p_1\|$, it gives good results in practice. The same computation is done for the axis system (O',U',V',W') attached to the other pair. FIG. 20 illustrates the rigid motion definition.

An example of the earlier-mentioned 3D vote which amounts to computing the argument of maximum for t* is now discussed.

By construction, Im(T) is a finite set of triples of 3D points, meaning that elements of Im(T) can be seen as points in $\mathbb{R}^9$. Given a numerical threshold $\varepsilon > 0$, the set of real numbers $\mathbb{R}$ can be written as the union of all intervals $[j\varepsilon, (j+1)\varepsilon[$:

$$\mathbb{R} = \bigcup_{j \in \mathbb{Z}} [j\varepsilon, (j+1)\varepsilon[$$

This way, $\mathbb{R}$ can be written as a union of boxes:

$$B_{j_1,\ldots,j_9} = \prod_{i=1}^{9} [j_i\varepsilon, (j_i+1)\varepsilon[$$

That is:

$$\mathbb{R}^9 = \bigcup_{(j_1,\ldots,j_9)\in\mathbb{Z}^9} B_{j_1,\ldots,j_9}$$

The vote in the example is to count the number of 9-tuples of Im(T) falling into each box $B_{j_1,\ldots,j_9}$ where $(j_1,\ldots j_9) \in \mathbb{Z}$ and to select the box totaling the largest number of 9-tuples. Preferred threshold value is $\varepsilon=0.2 \max\{\|p_2-p_1\|, ((p_1, n_1), (p_2, n_2))\in P_M\}$.

For clarity, a table of integer numbers $\text{Vote}(j_1, \ldots, j_9)$ is used to update the votes in the algorithm of the below example pseudo-code. Similarly, a table $b(j_1, \ldots, j_9)$ of points in $\mathbb{R}$ is used to update the barycenter of points in each box. For optimization purposes, both can be replaced by hashed data structures. Integer BestVote is the current best vote and is updated all along the process. Integer SecondVote is the current best second vote and is updated all along the process. It is needed for the significance level.

```
BestVote := 0
Second Vote := 0
For i := 1 to i_max do begin
    (x_1, . . . , x_9) := T(i)
    For j := 1 to 9 do begin
        k_j := [x_j / ε]
    End for
    n := Vote(k_1, . . . , k_9)
    Vote(k_1, . . . , k_9) := n + 1
    b(k_1, ... , k_9) := n/(n+1) b(k_1, ... , k_9) + 1/(n+1) (x_1, ... , x_9)
    If Vote(k_1, . . . , k_9) > BestVote then
        BestVote := Vote(k_1, . . . , k_9)
        (k_1*, . . . , k_9*) := (k_1, . . . , k_9)
    Else if Vote(k_1, . . . , k_9) > SecondVote then
        Second Vote := Vote(k_1, . . . , k_9)
    End if
End for
```

The significance level may be the ratio $$\frac{BestVote}{SecondVote}$$

for comparing BestVote and SecondVote values. The principle is that the voting process is meaningful if BestVote is "much larger" than SecondVote, meaning that "many" anchor points are transformed into the same box, typically, when $$\frac{BestVote}{SecondVote} \geq 2.$$

Mathematically, the best rigid motion (detailed in next paragraph) can always be computed, even if the vote is not meaningful. The decision to retain the best rigid motion, or several of the best, or none, is merely a matter of implementation, depending on the application of the method.

The selected value $t^*$ is the barycenter of points in the selected box $(k_1^*, \ldots, k_9^*)$, that is:

$$t^* = b(k_1^*, \ldots, k_9^*)$$

For convenience, it is written so that its three points $s_1, s_2, s_3$ are made explicit.

$$t^* = (s_1, s_2, s_3)$$

Figure 21:
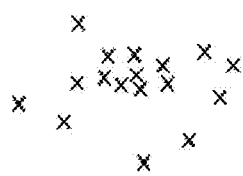
Figure 22:
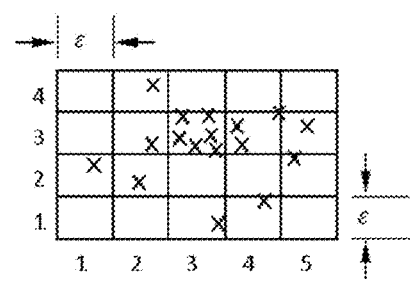

FIGS. 21-22 illustrate the voting process in a 2-dimensional situation (as opposed to the 9-dimensional situation). FIG. 21 shows the set Im(T) of 2D points. FIG. 22 the $\varepsilon \times \varepsilon$ boxes paving $\mathbb{R}^2$. The selected box is $(k_1^*, k_2^*)=(3,3)$ because it includes the largest number of points: $BestVote=Vote(k_1^*,k_2^*)=6$. The best second vote is $SecondVote=Vote(4,3)=2$ so that the significance level is $$\frac{BestVote}{SecondVote} = \frac{6}{2} = 3 > 2.$$

An example of how to compute the best rigid motion is now provided.

According to previous discussions, the point may now be to find the best rigid motion $d^*$ changing the anchor points $A=(m_1,m_2,m_3)$ of model M into the selected triple of points $t^*=(s_1,s_2,s_3)$ of scene S. This best rigid motion $d^*$ is defined by a translation $T^*$ and a rotation $R^*$ so that $d^*(x)=R^*x+T^*$ for all $x\in\mathbb{R}^3$. Rotation $R^*$ and translation $T^*$ may be computed as follows.

The following vectors are computed using $m_1$, $m_2$, $m_3$.

$$U=m_2-m_1$$

$$V=m_3-m_1$$

$$W=U\times V$$

Same with $s_1$, $s_2$, $s_3$:

$$U'=s_2-s_1$$

$$V'=s_3-s_1$$

$$W'=U'\times V'$$

Then, matrix P is computed using U, V, W, U', V' and W'.

$$P=[U'V'W'][UVW]^{-1}$$

It should be noticed that (U,V,W) and (U',V',W') are generally non orthogonal axis systems, making P a generally non orthogonal matrix. For this reason, mapping $R^*$ is the nearest rotation to P. It is unique and can be computed using singular value decomposition, as explained for example in paper "Andriy Myronenko, Xubo Song, *On the closed-form solution of the rotation matrix arising in computer vision problems*, 9 Apr. 2009". Finally, translation $T^*$ is defined by: $T^*=s_1-R^*m_1$.

The invention claimed is:

1. A computer-implemented method for localizing a 3D modeled object in a 3D scene, the 3D modeled object and the 3D scene each including respective 3D points, each 3D point being associated to a respective normal vector, the method comprising:

positioning the 3D modeled object in the 3D scene, the positioning being performed following an algorithm that rewards, for each of first couples made of two 3D points of the 3D modeled object and their respective associated normal vectors, a match with a respective second couple made of two 3D point of the 3D scene and its respective associated normal vectors, the first couple being positioned substantially on the second couple, the match between the first couple and the second couple amounting to a substantial equality between the value of a descriptor for the first couple and the value of the descriptor for the second couple, the substantial equality between the value of the descriptor for the first couple and the value of the descriptor for the second couple being a substantial equality between a first integer number corresponding to the value of the descriptor for the first couple and a second integer number corresponding to the value of the descriptor for the second couple,
wherein the method further comprises:
computing the first integer number and the second integer number via a quantization mapping applied respectively to the value of the descriptor for the first couple and to the value of the descriptor for the second couple, wherein the quantization mapping is of the type $\sigma: P_M \cup P_S \rightarrow \mathbb{N}$ defined by composition $\sigma = Q \circ F$, where for all $((p_1,n_1), (p_2, n_2)) \in P_M \cup P_S$:

$$\sigma((p_1,n_1),(p_2,n_2))=Q(F(p_1,n_1,p_2,n_2))$$

and where:
$B=\{(x,y,z)\in \mathbb{R}^3, x^2+y^2+z^2=1\}$ is the unit sphere,
$K=\mathbb{R}^3 \times B$ is the set of couples made of a 3D point and a normal vector,
M is the 3D modeled object, including a finite subset of K, with $M=\{m_i, i=1, \ldots, |M|\}$ with $m_i \in \mathbb{R}^3 \times B$ for all i,
S is the 3D scene, including a finite subset of K, with $S=\{s_i, i=1, \ldots, |S|\}$ with $s_i \in \mathbb{R}^3 \times B$ for all i,
$P_M$ is the set of all couples of elements of M, with $P_M=\{((p_1,n_1), (p_2,n_2)), (p_1,n_1)\in M, (p_2,n_2)\in M\}=M \times M$,
$P_S$ is the set of all couples of elements of S, with $P_S=\{((p_1,n_1), (p_2,n_2)), (p_1,n_1)\in S, (p_2,n_2)\in S\}=S \times S$, and
$H=F(P_M \cup P_S)$ is the finite set of all 4-tuples $F(p_1,n_1,p_2,n_2)$ when $((p_1,n_1), (p_2,n_2))\in P_M \cup P_S$,
$Q:H \rightarrow \mathbb{N}$ is the quantization mapping, with $Q(r_1,r_2,r_3,r_4)=q_1\delta_2\delta_3\delta_4+q_2\delta_3\delta_4+q_3\delta_4+q_4$, $$q_i = \left[\frac{r_i}{\varepsilon_i}\right] - \left[\frac{r_i^{min}}{\varepsilon_i}\right],$$

with $q_i$ integer numbers defined for $i=1, \ldots, 4$ given an arbitrary 4-tuple $(r_1,r_2,r_3,r_4)\in H$,
$\delta_i$ for $i=1, \ldots, 4$ are integer numbers defined as $$\delta_i = \left[\frac{r_i^{max}}{\varepsilon_i}\right] - \left[\frac{r_i^{min}}{\varepsilon_i}\right],$$

with [r] denoting the greatest integer number less than or equal to a given real number r,
$\varepsilon_i$, $i=1, \ldots, 4$ are four real numbers that represent the resolutions of the quantization, and
$r_i^{min}$ and $r_i^{max}$ with $i=1, \ldots, 4$ are eight real numbers such that, for $i=1, \ldots, 4$ and all $(r_1,r_2,r_3,r_4)\in H$, $r_i^{min} \leq r_i \leq r_i^{max}$.

2. The computer-implemented method of claim 1, wherein the resolutions of the quantization are equal, at least ±50%, to:

$\varepsilon_1=0.05(r_1^{max}-r_1^{min})$ $\varepsilon_2=0.1$ $\varepsilon_3=0.1$ $\varepsilon_4=0.08$.

3. The computer-implemented method of claim 1, wherein the substantial equality amounts to the exact equality between the first integer number and the second integer number.

4. The computer-implemented method of claim 3, wherein the algorithm runs through second couples, accesses all first couples that match a respective second couple under run, and outputs a positioning of the 3D modeled object in the 3D scene that rewards the first couple being positioned substantially on the accessed respective second couple.

5. The computer implemented method according to claim 4, wherein the result of applying the quantization mapping to the value of the descriptor for first couples is stored in an indexed table.

6. The computer-implemented method of claim 1, wherein the algorithm corresponds to a best vote among all positionings that each position a respective first couple on a respective matching second couple, the best vote retaining the largest group of positionings that position in substantially the same way three anchor points of the respective 3D points included in the 3D modeled object.

7. The computer-implemented method of claim 6, wherein the anchor points are three unaligned points of model M, preferably noted $A=(m_1,m_2,m_3)$ and respecting: arg max$\{\|m_1-m_2\|^2+\|m_1-m_3\|^2+\|m_2-m_3\|^2$; $(m_1,n_1), (m_2,n_2), (m_3,n_3)\in M\}$.

8. The computer-implemented method of claim 6, wherein the positionings of the largest group of positionings all position the three anchor points in a same cell of a predetermined 3x3D grid.

9. The computer-implemented method of claim 1, wherein the second couples through which the algorithm runs are a representative subset of the respective 3D points included in the 3D scene.

10. The computer-implemented method of claim 9, wherein the representative subset is obtained from a downsizing of the respective 3D points included in the 3D scene, the downsizing including a spatial clustering of the respective 3D points included in the 3D scene and a probabilistic selection based on the result of the clustering, the probabilistic selection rewarding large clusters and/or close clusters.

11. The computer-implemented method of claim 10, wherein the spatial clustering is a K-means clustering.

12. The computer-implemented method of claim 1, wherein the algorithm corresponds to a best vote among all rigid motions that each positions a respective first couple on a respective matching second couple, each rigid motion being determined based exclusively on a respective orthonormal axis system attached to its respective first couple and on a respective orthonormal axis system attached to its respective second couple, the respective orthonormal axis systems being each determined from respectively the respective first couple and the respective second couple based on only one of the two points and its respective associated normal vector.

13. A non-transitory computer readable storage medium having recorded thereon a computer program including instructions for performing a method for localizing a 3D modeled object in a 3D scene, the 3D modeled object and the 3D scene each including respective 3D points, each 3D point being associated to a respective normal vector, the method comprising:
positioning the 3D modeled object in the 3D scene, the positioning being performed following an algorithm that rewards, for each of first couples made of two 3D points of the 3D modeled object and their respective associated normal vectors, a match with a respective second couple made of two 3D point of the 3D scene and its respective associated normal vectors, the first couple being positioned substantially on the second couple, the match between the first couple and the second couple amounting to a substantial equality between the value of a descriptor for the first couple and the value of the descriptor for the second couple, the substantial equality between the value of the descriptor for the first couple and the value of the descriptor for the second couple being a substantial equality between a first integer number corresponding to the value of the descriptor for the first couple and a second integer number corresponding to the value of the descriptor for the second couple, wherein the method further comprises:

computing the first integer number and the second integer number via a quantization mapping applied respectively to the value of the descriptor for the first couple and to the value of the descriptor for the second couple, wherein the quantization mapping is of the type $\sigma: P_M \cup P_S \to \mathbb{N}$ defined by composition $\sigma = Q \circ F$, where for all $((p_1, n_1), (p_2, n_2)) \in P_M \cup P_S$;

$$\sigma((p_1,n_1),(p_2,n_2)) = Q(F(p_1,n_1,p_2,n_2))$$

and where:

$B = \{(x,y,z) \in \mathbb{R}^3, x^2+y^2+z^2=1\}$ is the unit sphere, $K = \mathbb{R}^3 \times B$ is the set of couples made of a 3D point and a normal vector, M is the 3D modeled object, including a finite subset of K, with $M = \{m_i, i=1, \ldots, |M|\}$ with $m_i \in \mathbb{R}^3 \times B$ for all i, S is the 3D scene, including a finite subset of K, with $S = \{s_i, i=1, \ldots, |S|\}$ with $s_i \in \mathbb{R}^3 \times B$ for all i, $P_M$ is the set of all couples of elements of M, with $P_M = \{((p_1,n_1), (p_2,n_2)), (p_1,n_1) \in M, (p_2,n_2) \in M\} = M \times M$, $P_S$ is the set of all couples of elements of S, with $P_S = \{((p_1,n_1), (p_2,n_2)), (p_1,n_1) \in S, (p_2,n_2) \in S\} = S \times S$, and $H = F(P_M \cup P_S)$ is the finite set of all 4-tuples $F(p_1,n_1,p_2,n_2)$ when $((p_1,n_1), (p_2,n_2)) \in P_M \cup P_S$, $Q: H \to \mathbb{N}$ is the quantization mapping, with $Q(r_1,r_2,r_3,r_4) = q_1 \delta_2 \delta_3 \delta_4 + q_2 \delta_3 \delta_4 + q_3 \delta_4 + q_4$, $$q_i = \left[\frac{r_i}{\varepsilon_i}\right] - \left[\frac{r_i^{min}}{\varepsilon_i}\right],$$

with $q_i$ integer numbers defined for $i=1, \ldots, 4$ given an arbitrary 4-tuple $(r_1,r_2,r_3,r_4) \in H$, $\delta_i$ for $i=1, \ldots, 4$ are integer numbers defined as $$\delta_i = \left[\frac{r_i^{max}}{\varepsilon_i}\right] - \left[\frac{r_i^{min}}{\varepsilon_i}\right],$$

with [r] denoting the greatest integer number less than or equal to a given real number r, $\varepsilon_i, i=1, \ldots, 4$ are four real numbers that represent the resolutions of the quantization, and $r_i^{min}$ and $r_i^{max}$ with $i=1, \ldots, 4$ are eight real numbers such that, for $i=1, \ldots, 4$ and all $(r_1,r_2,r_3,r_4) \in H$, $r_i^{min} \leq r_i \leq r_i^{max}$.

14. The non-transitory computer readable storage medium according to claim 13, wherein the resolutions of the quantization are equal, at least ±50%, to:

$$\varepsilon_1 = 0.05(r_1^{max} - r_1^{min})$$

$$\varepsilon_2 = 0.1$$

$$\varepsilon_3 = 0.1$$

$$\varepsilon_4 = 0.08.$$

15. The non-transitory computer readable storage medium according to claim 13, wherein the substantial equality amounts to the exact equality between the first integer number and the second integer number.

16. The non-transitory computer readable storage medium according to claim 15, wherein the algorithm runs through second couples, accesses all first couples that match a respective second couple under run, and outputs a positioning of the 3D modeled object in the 3D scene that rewards the first couple being positioned substantially on the accessed respective second couple.

17. The non-transitory computer readable storage medium according to claim 13, wherein the algorithm corresponds to a best vote among all positionings that each position a respective first couple on a respective matching second couple, the best vote retaining the largest group of positionings that position in substantially the same way three anchor points of the respective 3D points included in the 3D modeled object.

18. The non-transitory computer readable storage medium according to claim 17, wherein the anchor points are three unaligned points of model M, preferably noted $A = (m_1, m_2, m_3)$ and respecting: arg max$\{\|m_1-m_2\|^2 + \|m_1-m_3\|^2 + \|m_2-m_3\|^2; (m_1,n_1), (m_2,n_2), (m_3,n_3) \in M\}$.

19. The non-transitory computer readable storage medium according to claim 17, wherein the positionings of the largest group of positionings all position the three anchor points in a same cell of a predetermined 3×3D grid.

20. A system comprising:

a processor coupled to a memory and a graphical user interface, the memory having recorded thereon a computer program including instructions for performing a method for localizing a 3D modeled object in a 3D scene, the 3D modeled object and the 3D scene each including respective 3D points, each 3D point being associated to a respective normal vector, the processor implementing the computer program by being configured to position the 3D modeled object in the 3D scene, the positioning being performed following an algorithm that rewards, for each of first couples made of two 3D points of the 3D modeled object and their respective associated normal vectors, a match with a respective second couple made of two 3D point of the 3D scene and its respective associated normal vectors, the first couple being positioned substantially on the second couple, the match between the first couple and the second couple amounting to a substantial equality between the value of a descriptor for the first couple and the value of the descriptor for the second couple, the substantial equality between the value of the descriptor for the first couple and the value of the descriptor for the second couple being a substantial equality between a first integer number corresponding to the value of the descriptor for the first couple and a second integer number corresponding to the value of the descriptor for the second couple, wherein the processor is further configured to compute the first integer number and the second integer number via a quantization mapping applied respectively to the value of the descriptor for the first couple and to the value of the descriptor for the second couple, wherein the quantization mapping is of the type $\sigma: P_M \cup P_S \to H \to \mathbb{N}$ defined by composition $\sigma = Q \circ F$, where for all $((p_1,n_1), (p_2,n_2)) \in P_M \cup P_S$;

$$\sigma((p_1,n_1),(p_2,n_2))=Q(F(p_1,n_1,p_2,n_2))$$

and where:

$B=\{(x,y,z)\in \mathbb{R}^3, x^2+y^2+z^2=1\}$ is the unit sphere, $K=\mathbb{R}^3 \times B$ is the set of couples made of a 3D point and a normal vector, M is the 3D modeled object, including a finite subset of K, with $M=\{m_i, i=1, \ldots, |M|\}$ with $m_i \in \mathbb{R}^3 \times B$ for all i, S is the 3D scene, including a finite subset of K, with $S=\{s_i, i=1, \ldots, |S|\}$ with $s_i \in \mathbb{R}^3 \times B$ for all i, $P_M$ is the set of all couples of elements of M, with $P_M=\{((p_1,n_1), (p_2,n_2)), (p_1,n_1)\in M, (p_2,n_2)\in M\}=M\times M$, $P_S$, is the set of all couples of elements of S, with $P_S=\{((p_1,n_1), (p_2,n_2)), (p_1,n_1)\in S, (p_2,n_2)\in S\}=S\times S$, and $H=F(P_M \cup P_S)$ is the finite set of all 4-tuples $F(p_1,n_1,p_2,n_2)$ when $((p_1,n_1), (p_2,n_2))\in P_M \cup P_S$, $Q: H \to \mathbb{N}$ is the quantization mapping, with $Q(r_1,r_2,r_3,r_4)=q_1\delta_2\delta_3\delta_4+q_2\delta_3\delta_4+q_3\delta_4+q_4$, $$q_i = \left[\frac{r_i}{\varepsilon_i}\right] - \left[\frac{r_i^{min}}{\varepsilon_i}\right],$$

with $q_i$ integer numbers defined for $i=1, \ldots, 4$ given an arbitrary 4-tuple $(r_1,r_2,r_3,r_4)\in H$, $\delta_i$ for $i=1, \ldots, 4$ are integer numbers defined as $$\delta_i = \left[\frac{r_i^{max}}{\varepsilon_i}\right] - \left[\frac{r_i^{min}}{\varepsilon_i}\right],$$

with [r] denoting the greatest integer number less than or equal to a given real number r, $\varepsilon_i$, $i=1, \ldots, 4$ are four real numbers that represent the resolutions of the quantization, and $r_i^{min}$ and $r_i^{max}$ with $i=1, \ldots, 4$ are eight real numbers such that, for $i=1, \ldots, 4$ and all $(r_1,r_2,r_3,r_4)\in H$, $r_i^{min} \leq r_i \leq r_i^{max}$.

* * * * *